United States Patent
Takiguchi

(10) Patent No.: US 6,556,525 B1
(45) Date of Patent: Apr. 29, 2003

(54) DISK DRIVE DEVICE, AND UNRECORDED AREA DETECTING METHOD

(75) Inventor: Taizo Takiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 378 days.

(21) Appl. No.: 09/621,296

(22) Filed: Jul. 20, 2000

(30) Foreign Application Priority Data

Jul. 22, 1999 (JP) .......................................... 11-207378

(51) Int. Cl.[7] ................................................ G11B 7/00
(52) U.S. Cl. .................................. 369/53.24; 369/44.29
(58) Field of Search ............................ 369/47.5–47.53, 369/53.24, 44.29

(56) References Cited

U.S. PATENT DOCUMENTS 5,526,329 A * 6/1996 Bish et al. .............. 369/124.11
5,694,382 A * 12/1997 Oliver et al. ............ 369/53.24
5,790,482 A * 8/1998 Saga et al. ............... 369/13.27
5,793,713 A * 8/1998 Adachi .................... 369/13.02
5,909,418 A * 6/1999 Noda et al. ............... 369/53.36

* cited by examiner

Primary Examiner—W. R. Young
(74) Attorney, Agent, or Firm—Frommer Lawrence & Haug LLP; William S. Frommer

(57) ABSTRACT

With an arrangement having functions of detecting an unrecorded area by comparing a reproduction signal level obtained by conducting reproduction of a disk-shaped recording medium with a threshold, the setting of this threshold is performed by performing reproduction regarding an adjustment area serving as an unrecorded area on the disk-shaped recording medium while varying the adjusting threshold. Then, the threshold to be actually used for detection of unrecorded areas is set based on the comparison results between the adjusting threshold and the reproduction RF signal. Thus, a threshold appropriate for each device is automatically set for example, regardless of conditions such as differences in noise levels superimposed on reproduction signals, from one device to another. Thus, an appropriate threshold for blank checks can be set regardless of irregularities in parts from one device to another (i.e., regardless of differences in the noise levels superimposed on the reproduction RF signals from one device to another), thereby improving the reliability of blank checking.

8 Claims, 8 Drawing Sheets

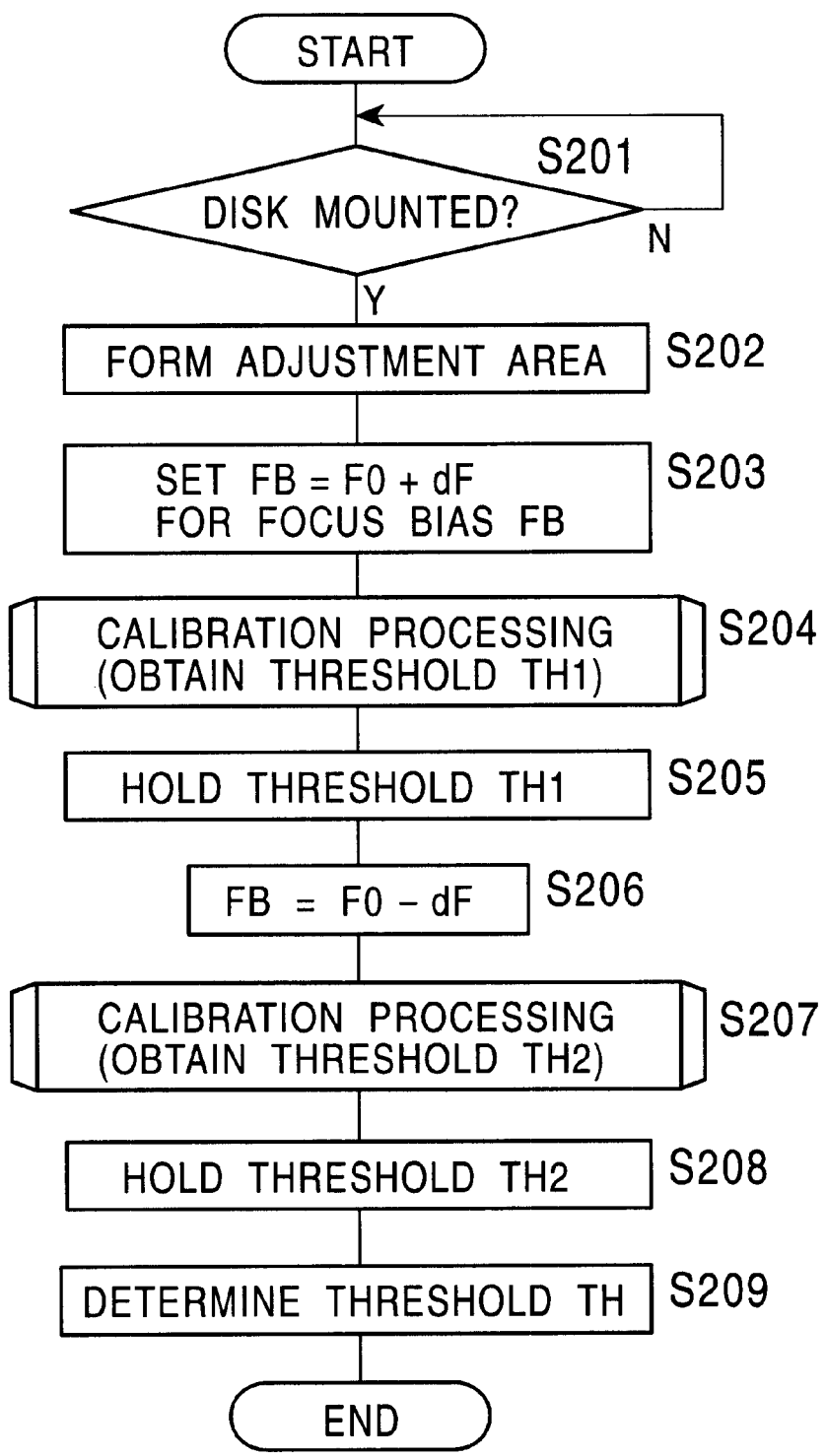

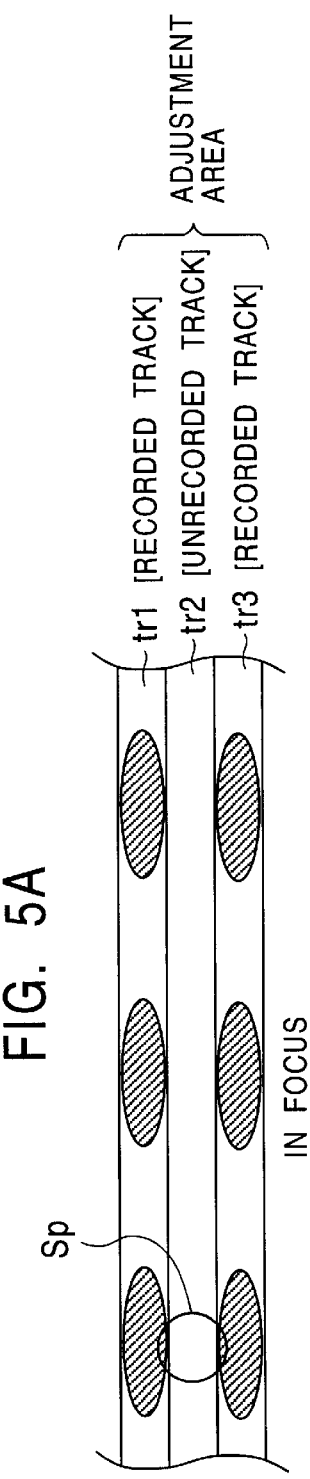
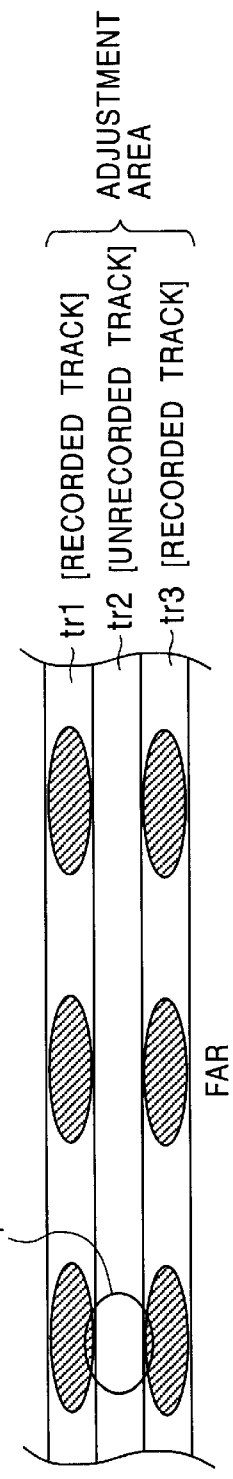
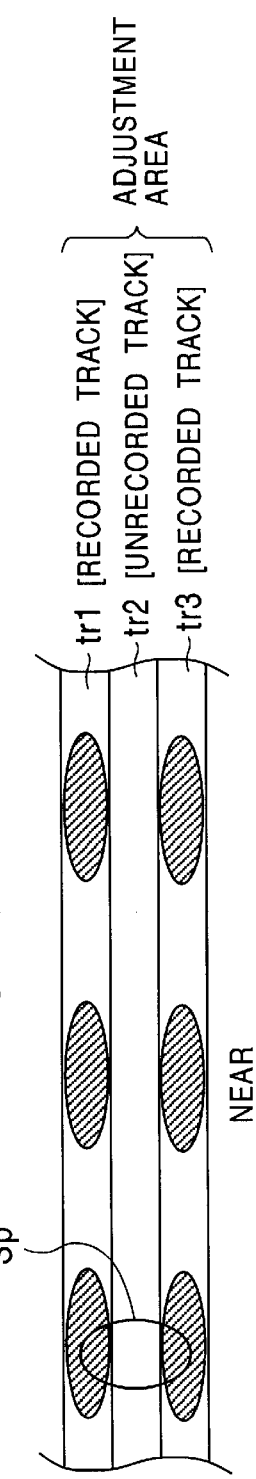

DISK DRIVE DEVICE, AND UNRECORDED AREA DETECTING METHOD

BACKGROUND OF THE INVENTION

1. Field of the Invention

The present invention relates to a disk drive device which performs recording or reproducing to or from a disk-shaped recording medium, and to an unrecorded area detecting method for detecting unrecorded areas on the signal plane of a disk-shaped recording medium with such a disk drive device.

2. Description of the Related Art

With drive devices which perform recording or reproducing actions to or from recording media such as optical disks, magneto-optical disks, etc., an action called "blank check" is performed for confirming whether a given sector ("sector" being a unit of data on the recording medium) has already been recorded upon or not.

For example, with drive devices handling WO (Write Once) type disks, data must be written to an unrecorded sector, so a blank check is carried out at the time of recording.

Also, with drive devices handling re-writable disks such as MOs (magneto-optical disks), in the event that an error has occurred at the time of decoding the read data (e.g., sync detection not possible, error correction not possible, etc.), a process for estimating the cause of the error is performed before initiating a read retry, by conducting a blank check of that sector. This is because the cause of the error in decoding and the retry process which should be corresponding are related to the state of the sector, i.e., whether the sector is deemed recorded or unrecorded.

For example, in the event that a read error occurs at the time of write-and-verify ("write-and-verify" is an action for reading out recorded data immediately following the recording action of the data, so as to confirm whether or not the data has been correctly recorded), there is a good chance that the action was not a read action and that the write action was not performed appropriately, in the event that the sector is an unrecorded area. On the other hand, in the event that a read error occurs during normal reproduction and the sector is an unrecorded area, the error is a matter of course, and the is not need to perform a read retry action. Also, in the event that the blank check results in the judgement that the section is a recorded area, measures such as changing the read conditions such as the amp gain and so forth should be changed to attempt a retry.

Now, it is considered necessary to perform blank checks for disk drive devices as described above, and the blank checks are conducted as follows for example, in actual practice.

FIG. 8A illustrates a model of a so-called reproducing RF signal waveform obtained by reading information by optical pick-up of a given area on a disk.

With the blank check, first, peak hold or bottom hold for example is performed for this reproducing RF signal, thereby obtaining an envelope waveform EV for the reproducing RF signal. Here, peak hold is performed for the reproducing RF signal.

Then, comparison is made between the level of this envelope waveform EV and a given threshold TH.

Now, in the event that the area (sector) is a recorded area wherein some sort of information has already been recorded, an amplitude waveform corresponding to the information (pits) recorded there is obtained for the reproducing RF signal, meaning that a corresponding level is also obtained for the envelope waveform EV. In this case, the level of the envelope waveform EV is to be greater than the threshold TH, but as long as such a relation is obtained between the level of such an envelope waveform EV and the threshold, judgement is made that the area is not an unrecorded area.

Conversely, in the event that reproduction is attempted for an unrecorded area, there is no information recorded thereto, so hardly any change in amplitude is obtained for the reproduction RF signal. Accordingly, the level of the envelope waveform EV is lower than the threshold TH, as shown in the Figure for example. In the event that such a relation is obtained, judgement is made that the area is an unrecorded area.

However, in actual practice, the reproduction RF signal obtained by reproducing an unrecorded area does not always assume an ideal waveform with almost no amplitude change as shown in FIG. 8A.

That is, as shown in FIG. 8B, there are cases wherein noise amplitude components are superimposed on the actual reproduction RF signals, and amplitudes greater than the reproduction RF signal level corresponding to the actual unrecorded area are obtained due to these amplitude components.

Then, in the event that the amplitude components superimposed as noise onto the reproduction RF signals obtained from the unrecorded area have a certain level or greater, the level of the envelope waveform EV may exceed the threshold TH, and in such cases, erroneous detection may be made that the area has been recorded on even though it is an unrecorded area.

In order to avoid such erroneous detection, the level of the threshold TH may be raised for the case in FIG. 8. That is to say, a threshold TH might be set which is closer to the recorded area side. However, such means are not suitable for actual usage, due to the following reason.

For example, in reality, reproduction RF signal levels obtained corresponding to recorded areas change due to margins of error or offsets in the signal processing systems. Accordingly, setting the threshold TH closer to the recorded area side conversely increases the probability that recorded areas will be erroneously detected as unrecorded areas.

Now, erroneously detecting recorded areas as unrecorded areas may bring about a somewhat fatal error wherein new data is overwritten in a recorded area in subsequent processing.

In light of this, there is the pragmatic need to set the threshold as a value as close as possible to a reproduction RF signal level corresponding to the unrecorded area.

Accordingly, conducting testing for a given device model in order to obtain a threshold which is as close as possible to a reproduction RF signal level corresponding to unrecorded areas and which is highly reliable, and setting this threshold for each device being shipped from the production line, is realistic.

However, causes for the noise component of the reproduction RF signals as described above include for example noise generated by detectors and signal processing system in optical pickups, cross-talk of data recorded on the track where detection was performed, etc., but such noise quantity is not necessarily the same for all devices of the same model, since there are irregularities in the optical pickups for each disk drive device, and in offset such as the gain of the signal processing system. Accordingly, obtaining a threshold common to each device with high reliability in a sure manner is difficult.

SUMMARY OF THE INVENTION

Accordingly, in light of the above problems, it is an object of the present invention to allow an appropriate threshold for blank checks to be set regardless of irregularities in parts from one device to another, i.e., regardless of differences in the noise levels superimposed on the reproduction RF signals from one device to another, thereby improving the reliability of blank checking.

To this end, the disk drive device is configured as follows.

The disk drive device comprises:

information writing/reading means for recording or reproducing information by irradiating laser beams onto a signal plane of a disk-shaped recording medium;

unrecorded area detecting means for detecting unrecorded areas on the signal plane, based on the results of comparing reproduction signal levels from the information writing/reading means with a predetermined threshold; and threshold adjusting means for executing adjustment actions for setting the threshold;

The threshold adjusting means comprise:

action control means for controlling the information writing/reading means so that a reproducing action is performed regarding a certain adjusting area which is an unrecorded area;

threshold variating means for changing the adjustment threshold at the time of performing reproducing actions regarding the adjusting area; and threshold determining means for making comparison for each changed adjustment threshold with reproduction signal levels, and determining the threshold based on the comparison results.

Also, the unrecorded area detecting method is configured as follows.

The unrecorded area detecting method is applied to a disk drive apparatus for recording or reproducing information by irradiating laser beams onto a signal plane of a disk-shaped recording medium, wherein execution of:

an unrecorded area detecting process for detecting unrecorded areas on the signal plane based on the results of comparing reproduction signal levels with a predetermined threshold; and a threshold adjusting process for setting the threshold are enabled.

The threshold adjusting process comprises:

an action control process for executing control so that a reproducing action is performed regarding a certain adjusting area which is an unrecorded area;

a threshold variating process for changing the adjustment threshold at the time of performing reproducing actions regarding the adjusting area; and a threshold determining process for making comparison for each changed adjustment threshold with reproduction signal levels, and determining the threshold based on the comparison results.

According to the above configuration, the setting of this threshold is performed by performing reproduction regarding an adjustment area serving as an unrecorded area on the disk-shaped recording medium while varying the adjusting threshold, under the assumption that the arrangement has the functions of detecting an unrecorded area by comparing a reproduction signal level obtained by conducting reproduction of the disk-shaped recording medium with a threshold. Then, the threshold actually used for detection of unrecorded areas is set based on the comparison results between the adjusting threshold and the reproduction RF signal. This means that a threshold appropriate for each device is automatically set, regardless of conditions such as differences in noise levels superimposed on reproduction signals, from one device to another.

BRIEF DESCRIPTION OF THE DRAWINGS

FIG. 4 is a flowchart illustrating the processing actions for blank check threshold setting (Second Example) according to the present embodiment;

FIG. 5 is an explanatory diagram describing the adjustment area according to the present embodiment, and the effects of cross-talk due to defocusing;

DESCRIPTION OF THE PREFERRED EMBODIMENTS

Embodiments of the present invention will now be described in the following order:

1. Configuration of disk drive device
2. Threshold setting action for blank check

2-1. FIRST EXAMPLE

2-2. SECOND EXAMPLE

1. Configuration of Disk Drive Device

Figure 1:
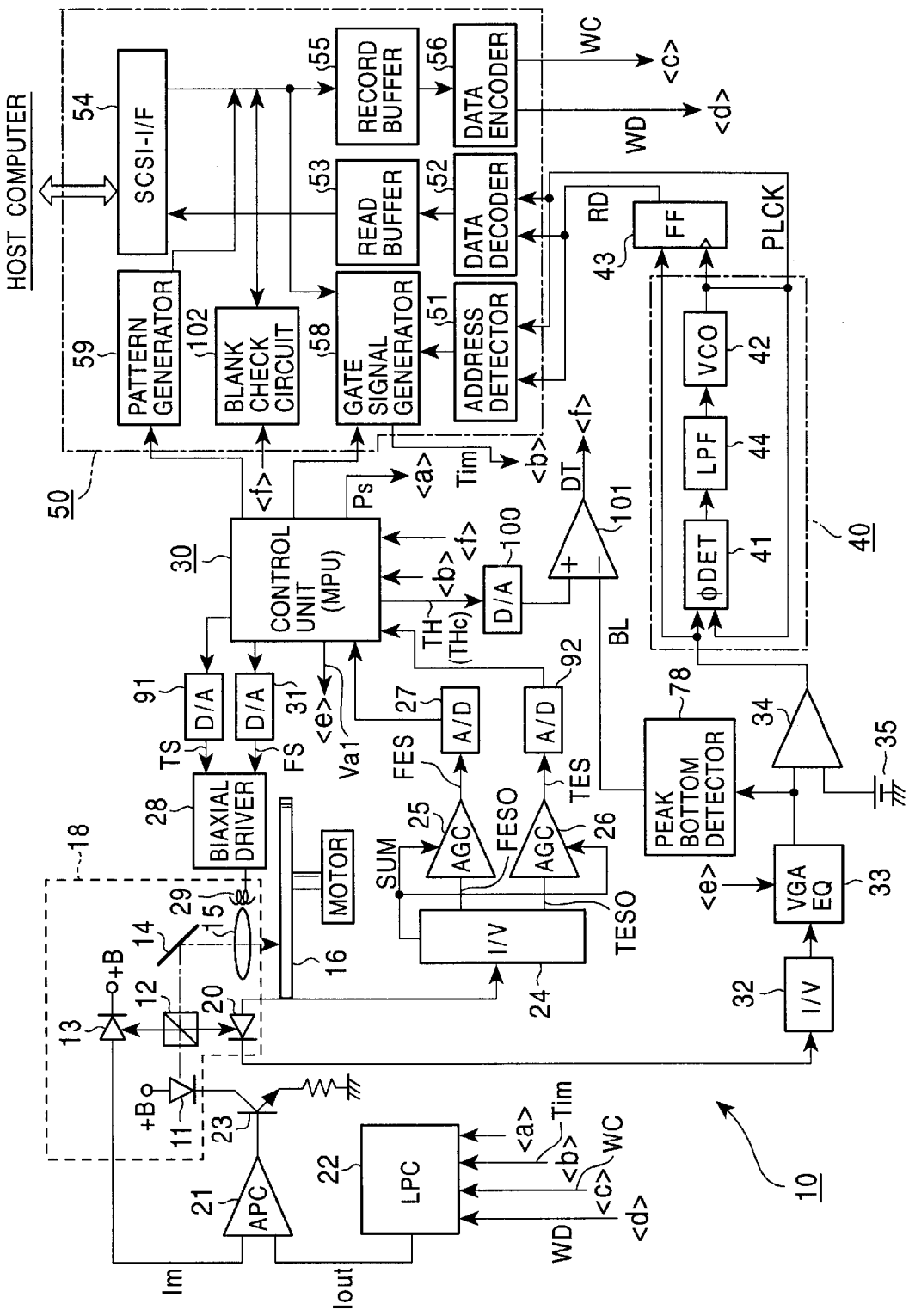
FIG. 1 is a block diagram illustrating the configuration of a disk drive device according to an embodiment of the present invention.

FIG. 1 is a block diagram describing a configuration example of the disk drive device according to the present embodiment. The disk drive device shown in this Figure is capable of reproduction corresponding at least to CD-ROM and CD-DA (Digital Audio) for example, and also capable of recording with CD-R, which is known as a WORM (Write Once Read Many) type.

Note that the reference characters <a>, <b>, <c>, <d>, <e>, and <f> in this FIGURE denote the paths for the signals they represents.

The disk 16 is mounted in the disk drive device 10, and thus placed on an unshown turntable, thereby being rotationally driven at a constant linear velocity (CLV) or a constant angular velocity (CAV) by a spindle motor 17 at the time of recording/reproducing action. The data recorded on the recording plane of the disk 16 is read out by an optical system comprising the later-described laser diode 11, object lens 15, etc., or data is recorded to the recording plane of the data disk 16.

Also, the object lens 15 is held by a later-described biaxial mechanism 29 so as to be capable of deviating in the radial direction of the disk 16 and in a direction drawing nearer to and distancing from the disk 16, and also, the entire optical head 18 comprising this object lens 15 is movable in the radial direction of the disk 16 by an unshown slide mechanism.

The laser beam output from the laser diode 11 serving as the emission source of the laser beam passes through the beam splitter 12 arranged to transmit polarized laser beams, and reaches the reflecting mirror 14. Also, while the laser beam is linearly polarized light, there is a certain amount of polarization distribution therein, and there is light flux reflected at the beam splitter 12. The light flux output from the laser diode 11 and reflected at the beam splitter 12 reaches the photo detector 13 for laser output power monitoring. The laser beam detected by the photo detector 13 is converted into a predetermined electric current Im and supplied to the margin of error amplifier for laser power control (Auto Power Control) 21.

Also, the margin of error amplifier 21 is supplied with the current Iout which serves as the reference for laser power output from the laser power control unit 22. Accordingly, electrical current corresponding to the laser beam currently being detected and the reference level stipulated in the disk drive device 10 beforehand is output from the margin of error amplifier 21, thereby controlling the impedance of a transistor device 23 controlling the laser diode 11. Accordingly, control is performed such that the output power of the laser beam at the laser diode 11 is Im=Iout, thereby maintaining the output power of the laser beam at a constant.

The electric current Iout output from the laser power control unit 22 can be changed by setting a value stored in the register provided to the laser power control unit 22, based on the power setting signal PS supplied from the driving control unit 30. Accordingly, the electric current Iout can be controlled so as to make predetermined output waveforms according to actions such as data recording power, data reproducing power, data deleting power, and so forth.

The laser beam which has transmitted through the beam splitter 12 and reached the reflecting mirror 14 is reflected here, and further passes through the object lens 15 and thus is irradiated on the recording plane of the disk 16. The object lens 15 is supported by he biaxial mechanism 29 so as to be movable in the tracking direction and the focus direction.

Incidentally, a state wherein the focal point of the object lens 15 is focused on the signal plane of the disk 16 is called "in focus".

The laser beam irradiated on the recording plane of the disk 16 has the polarization direction thereof rotated at portions where pits are formed on the recording plane. That is to say, the polarization direction of the reflected light from the disk 16 is different between that from portions where pits are formed and that from portions where pits are not formed (i.e., land). Accordingly, of the laser beam which has been reflected at the disk 16 and reached the beam splitter 12 via the reflection mirror 14, the laser beam which has changed in polarization direction having been reflected from the pits for example is reflected, and reaches the photo detector 20 for detecting reproducing data.

The photo detector 20 is of a configuration having a detection area divided four ways for example, and detection current from each detection area is supplied to a current/voltage detector 24. Then, in the example shown in this Figure for example, a focus error signal FESO, tracking error signal TESO, and a sum signal SUM wherein all detection currents detected in all detection areas have been added, are formed.

The focus error signal FESO and tracking error signal TESO are controlled respectively by an auto gain control circuit (hereafter referred to simply as "AGC") 25 and AGC 26, so that a predetermined output level can be obtained based on the sum signal SUM, in order to avoid the levels thereof from changing according to the output power of the laser beam.

The focus error signal FES which has been subjected to gain adjustment at the AGC 25 is converted into a digital signal by the A/D converter 27, and is supplied to the driving control unit 30 made up of a microprocessor unit, for example. The focus error signal FES supplied to the driving control unit 30 is subjected to a necessary focus bias as described later, passes through an unshown compensating filter, and is output to the D/A converter 31 as a focus drive signal. The focus drive signal FS converted into an analog signal at this D/A converter 31 is supplied to the biaxial driver 28. The biaxial driver 28 drives the biaxial mechanism 29 based on the focus drive signals FS.

Also, the tracking error signal TES which has been subjected to gain adjustment at the AGC 26 is converted into a digital signal by the A/D converter 91 for example, and is supplied to the driving control unit 30 for example. Then, through description is omitted here, the driving control unit 30 forms necessary tracking drive signal TS based on the tracking error signal TES. Then, after conversion into a digital signal at the D/A converter 91, this is supplied to the biaxial driver 28 which is the diving control means for the object lens 15.

The biaxial driver 28 is configured of, for example, a focus coil driver and a tracking coil driver. The focus coil driver drives the object lens 15 in the direction of drawing nearer to and farther away from the disk plane (i.e., the focus direction), by supplying driving current generated based on the focus drive signals FS to the focus coil of the biaxial mechanism 29. Also, the tracking coil driver drives the object lens 15 so as to move in the radial direction of the disk (i.e., the tracking direction), by supplying driving current generated based on the tracking drive signals TS to the tracking coil of the biaxial mechanism 28.

Thus, the object lens 15, photo detector 20, AGCs 25 and 26, driving control unit 30, and biaxial driver 29 form a tracking servo loop and focus servo loop.

On the other hand, the output of the photo detector 20 is also supplied to the current/voltage converting unit 32, and is converted into reproduction signals containing address information for the data read from the disk 16, and supplied to a variable gain setting unit 33.

The variable gain setting unit 33 is provided with level adjusting means for subjecting reproduction RF signals to equalizing processing based on VGA (Variable Gain Amp) setting signals Val supplied from the driving control unit 30, an equivalency filter, and so forth.

The reproduction RF signal adjusted to a necessary amplitude level by this variable gain setting unit 33 is binarized (i.e., made into a digital signal) by the comparator 34 based on a reference voltage 35, and is supplied to a PLL (Phase Locked Loop) circuit 40.

The PLL circuit 40 comprises a phase comparator 41, voltage controlled oscillator 42, and a low-pass filter 44, and generates a reproduction clock PLCK synchronized to the channel bit frequency of the input binarized signal.

That is to say, the binarized signal supplied from the comparator 34 is subjected to phase comparison with the reproduction clock PLCK output from the VCO 42 at the phase comparator 41, and is converted to a voltage level according to a phase margin of error, by means of the phase margin of error detected by the phase comparator 41 passing through the low-pass filter 44. This voltage level is made to be a phase error signal PE. Then, controlling the oscillation frequency of the VCO 42 with this phase error signal PE generates the reproduction clock PLCK synchronized to the binarized signal.

The reproduction clock PLCK thus generated is supplied to a flip-flop circuit 43 along with the binarized signal, and reproduction data RD synchronized with the reproduction clock PLCK is generated.

The data transfer control unit 50 performs control of the recording/reproducing systems for example, of a SCSI (Small Computer Serial Interface) 54 serving as the interface means for performing communication control for performing necessary data communication with an unshown host computer, a data decoder 54, data encoder 56, and so forth.

The reproduction data RD is supplied to the address detecting unit 51 and data decoder 52. The address detecting unit 51 extracts and demodulates address signals of the reproduction data RD therefrom.

The data decoder 52 performs necessary address management based on address signals detected by the address detecting unit 51, while performing decoding processing of the reproduction data RD. Also, the data decoder 52 extracts error correction code such as ECC (Error Correction Code) attached to the reproduction data RD, performs the necessary error correction processing, and performs verification of read errors for the reproduction data RD.

The reproduction data RD decoded by this data decoder 52 is transferred to the host computer via the SCSI interface 54, following a necessary number of units of the reproduction data RD having been stored in the reproduction buffer 53.

On the other hand, regarding the recording action, at the point that a recording command is received from the host computer for example, the mode shifts to the recording mode wherein the necessary laser output power is set in the laser power control unit 22, based on the laser power setting signal PS output from the driving control unit 30.

The data to be recorded in the recording mode is stored in the recording buffer 55 via the SCSI interface 54. In this case as will, following a necessary number of units of the recording data having been stored, recording is executed for each data unit. Also, the address on the disk 16 regarding which data recording is to be performed is supplied form the host computer, and a gate signal generating unit 58 for example performs address management. That is to say, in the event that the laser beam (beam spot) is scanning the recording plane of the disk 16, the gate signal generating unit 58 outputs timing signals Tim for executing writing of the recording data to the laser power control unit 22 at the timing of the address which is the target instructed from the host computer, based on the address signals supplied from the address detecting unit 51.

Further, synchronously with this timing signal Tim, the data encoder 56 supplies recording data WD and a datasynchronizing recording clock WC corresponding to the recording data WD to the laser power control unit 22. Also, the data encoder 56 is arranged so as to add error correction code regarding the recording data as ECC format processing.

The pattern generating unit 59 generates necessary pattern signals based on pattern data (increment patterns, 6T patterns, decrement patterns, etc.) of text signals supplied from the later-described write pattern setting unit, and supplies the same to the recording buffer 55.

Also, in this Figure, a blank check circuit unit 102 is provided to the data transfer control unit 50.

The blank check circuit unit 102 is input with detection signals DT regarding blank areas input from the later-described comparator 101. Then, instruction signals for permitting/forbidding data writing for example are output to the gate signal generating unit 58, based on the detecting signals. For example, with the gate signal generating unit 58, the above-described writing control (address management) is executed in the event that permission for data writing has been obtained. Also, in the event that writing of data is forbidden for example, stopping the output of the above-described timing signal Tim prevents data writing from being executed. The object of this is to prevent data from being written to a recorded area at the time that detection is being made that an area is not unrecorded (i.e., is a recorded area), for example.

In the state of shifting to the recording mode, the laser power control unit 22 inputs the timing signal Tim, recording clock WC, and recording data WD, thereby supplying the current Iout corresponding to the recording data WD to the margin of error amp 21 as the recording level current. Accordingly, the laser diode 11 outputs laser beams of a recording level, based on the current Iout. That is to say, pits corresponding to the recording data are formed on the recording plane of the disk 16, by laser beams modulated by the current Iout corresponding to the recording data.

Also, since the media which is can be recorded with the disk drive device according to the present embodiment is a WORM type CD-R, there is no need to delete the pits recorded on the disk 16.

Note however that in the event that the disk drive device according to the present embodiment is made to apply to re-writable disk media due to phase change for example, as with the following configuration, the data recorded on the disk can be deleted.

In order to delete the data (pits) recorded on the disk 16, upon receiving a delete command from the host computer for example, the mode shifts to the deleting mode wherein the current Iout is set in the laser power control unit 22 as deleting power, based on the laser power setting signal PS output from the driving control unit 30. Then, in the same way as with recording, the gate signal generating unit 51 outputs the timing signals Tim for executing deletion of the data to the laser power control unit 22 at the timing of the addressees for performing the deletion instructed from the host computer, based on the address signals supplied from the address detecting unit 51. Thus, the laser diode 11 is capable of outputting laser beams of a deleting level at the address for which deletion is to be performed, and the data recorded in the recording plane of the disk 16 is deleted.

The peak/bottom detecting unit 78 is arranged so that the reproduction RF signals regarding which the necessary gain adjustment has been performed by the variable gain setting unit 33 are input, and the peak level and bottom level of the amplitude of the reproduction RF signals can be detected. That is to say, the envelope waveform level of the reproduction RF signal level is obtained as the reproduction RF signal level.

The level of the envelope waveform of the reproduction RF signals detected here is input to a comparator 101.

Regarding the input to the other side of this comparator 101, a threshold TH for blank check which is output from the driving control unit 30 (or an adjustment threshold THC used at the time of calibrating for threshold settings) is converted into analog voltage values for example by an A/D converter 100 and input.

Regarding the action at the time of blank check, the comparator 101 compares this threshold TH with the level of the envelope waveform of the reproduction RF signal, and outputs the comparison signal DT thereof. For example, whether or not the area is an unrecorded area is indicated by whether the comparison signal DT is an H level or an L level for example, as described with reference to FIG. 8A.

This comparison signal DT is output to the blank check circuit unit 102 within the data transfer control unit 50, and the driving control unit 30.

In this way, according to the present embodiment, a configuration is provided for the blank check, but with the present embodiment in particular, the configuration for this blank check itself is also used in the adjusting action for setting the threshold used for the blank check, as will be described later.

Incidentally, in the event that a phase change type disk for example is to be used as the disk 16 inn order to perform recording/deletion, data recording can be performed by modulating the output level of the laser power. Also, in the event of performing recording/deletion with a magneto-optical disk for example, in contrast with the configuration shown in FIG. 1, an arrangement is used wherein a magnet is provided at a positing facing the object lens 15 across from the disk 16 so as to perform control of generation of a necessary magnetic field along with the output of the laser beam.

Figure 2:
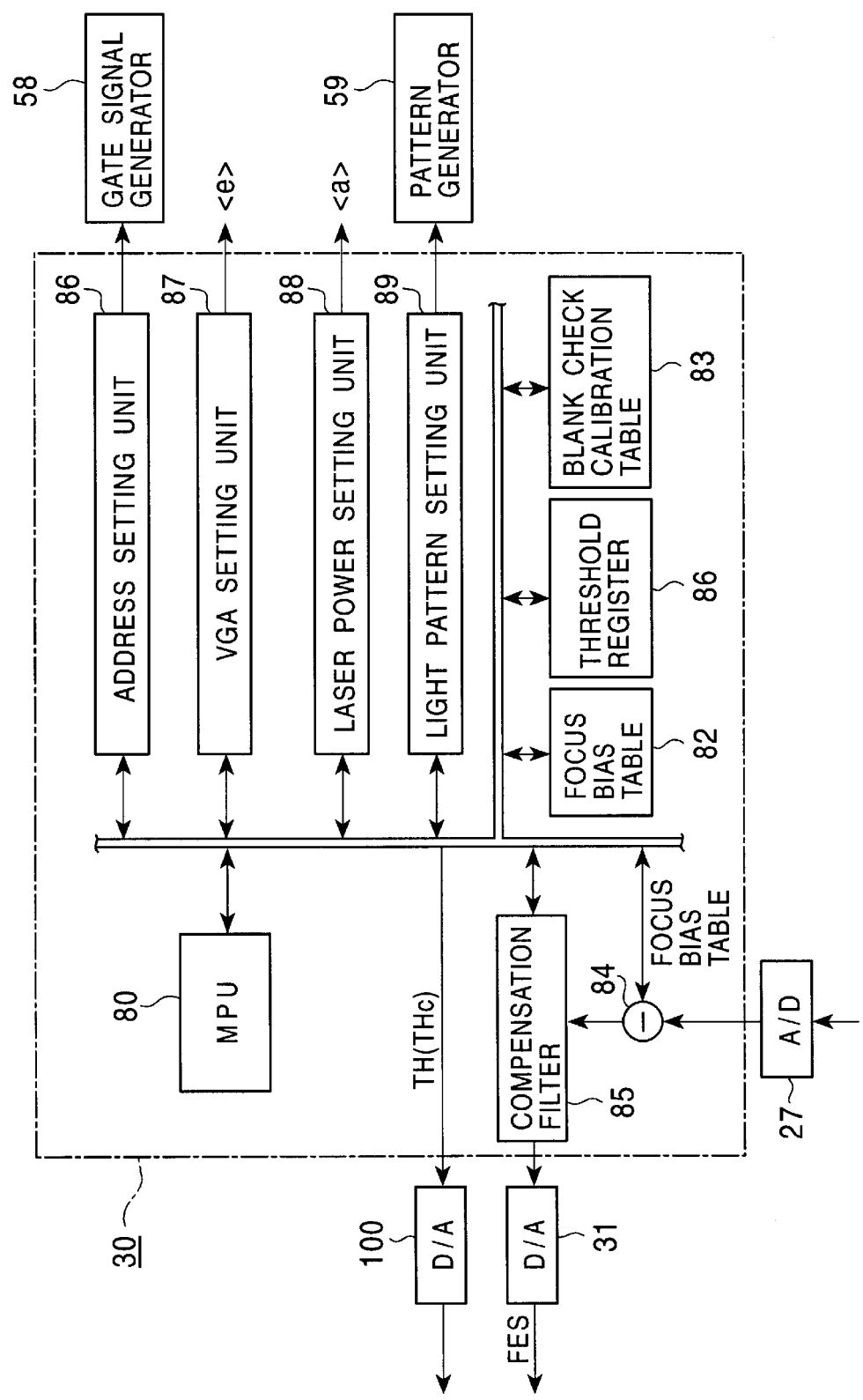
FIG. 2 is a block diagram illustrating an internal configuration example of the driving control unit.

FIG. 2 is a block diagram illustrating a partial configuration example of the driving control unit 30.

The driving control unit 30 is provided with various servo controls such as the focus servo and tracking servo, and a microprocessor unit (MPU) 80 for executing the various control processes relating to recording and reproduction, and is connected to the memory means and signal processing systems via the bus 81.

The focus error signals FES supplied to the driving control unit 30 are provided with optimal focus bias values in the focus bias values holed in the focus bias table 82 for example in the subtracter 84, and are output to the D/A converter 31 via the compensating filter 85. Then, following conversion to analog signals at the D/A converter 31, these are supplied to an unshown biaxial driver 28 as focus servo signals FS.

The address setting unit 86 performs address setting to the gate signal generator 58, in cases such as the later-described case of recording test signals. Accordingly, necessary timing signals are generated by the gate signal generator 58, based on the addresses set at the address setting unit 86.

The VGA setting unit 87 outputs the VGA setting signal Val for the variable gain setting unit 33 to perform gain adjustment of the reproduction RF signals.

The laser power setting unit 88 outputs the laser power setting signal PS to the laser power control unit 22, in order to obtain laser beams of a necessary level.

The light pattern setting unit 89 sets the patterns (increment patterns, 6T patterns, decrement patterns, etc.) of text signals to be recording to addresses set at the address setting unit 86, and supplies these to the pattern generating unit 59 shown in FIG. 1.

Now, though this Figure only shows the signal path for the focus error signal FES, the tracking error signal TES is also supplied to the driving control unit 30 as shown in FIG. 1, so that necessary signal processing is performed and supplied to the biaxial driver 28.

Also, with the present embodiment, a blank check calibration table 83 and threshold register 86 are provided. These relate to the above-described blank check functions.

The blank check calibration table 83 stores adjusting thresholds which are variable for the purpose of adjustment during the calibration action for setting the threshold for the blank check performed as described later, and check results corresponding thereto. The table contents of the blank check calibration table 83 will also be described later.

Then, by control of the MPU 80 for example, the threshold TH used at the time of the blank check, or the adjustment threshold THc changed and set at the time of the above calibration action, are set to the threshold register 86.

The threshold TH (THc) set to the threshold register 86 are read out by the MPU 80 for example, converted to an analog voltage value via the D/A converter 100, and supplied to the comparator 101 (see FIG. 1).

2. Threshold Setting Action for Blank Check

2-1. FIRST EXAMPLE

Now, assuming upon the configuration described so far, a first example of a setting action for the threshold value for the blank check according to the present embodiment will be described.

Figure 3:
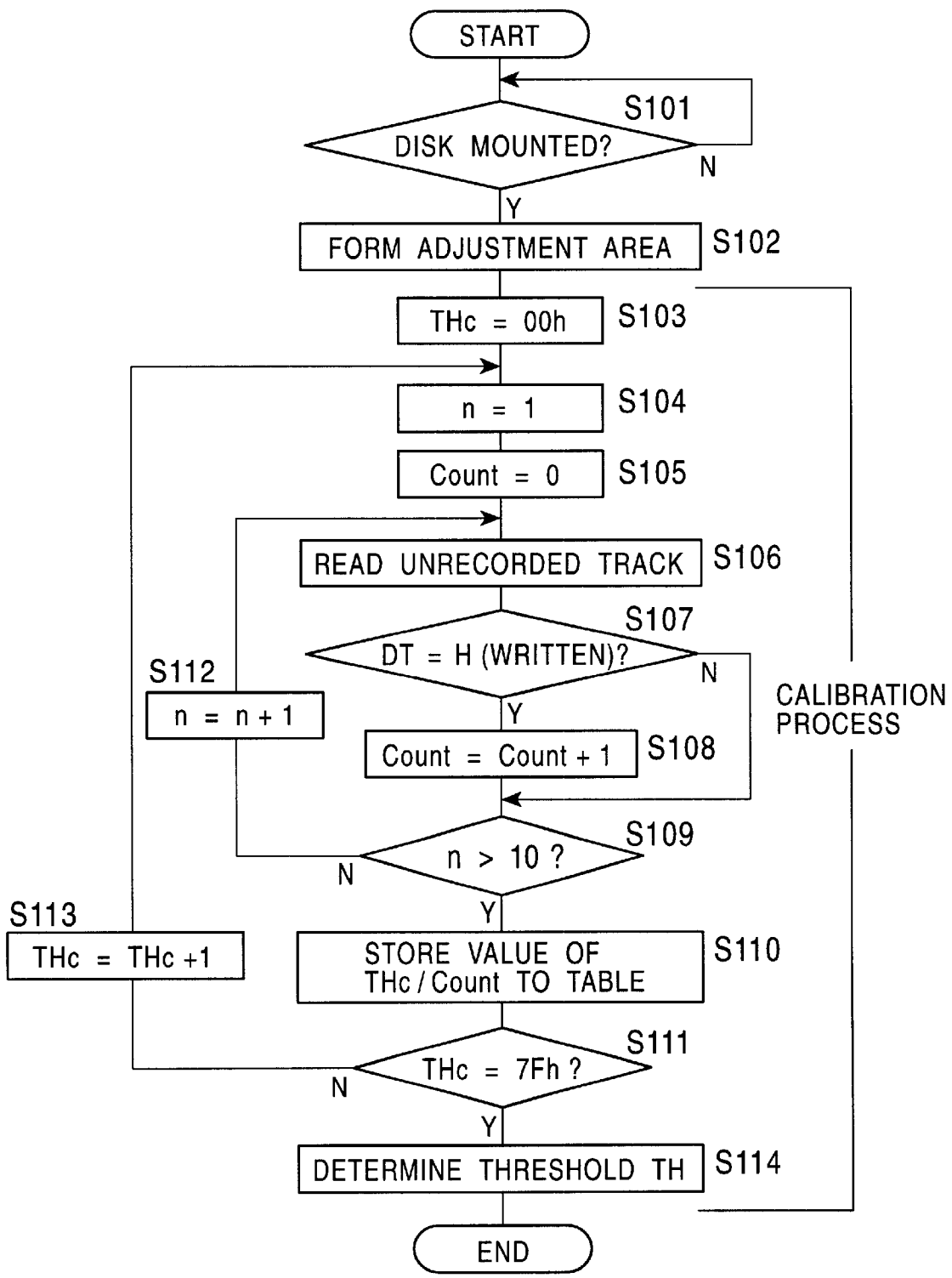
FIG. 3 is a flowchart illustrating the processing actions for blank check threshold setting (First Example) according to the present embodiment.

FIG. 3 is a flowchart illustrating the processing action for realizing the setting action for the threshold value for the blank check (calibration action) as this first example.

Now, following the flow of the flowchart shown in FIG. 3, description will be made along with reference to other drawings as necessary. It is understood that the processing shown in the Figure is executed by the MPU 80 (see FIG. 2).

Now, in the present embodiment, the threshold setting action for blank check is performed each time a disk is mounted. Accordingly, the MPU 80 first waits for a disk to be mounted, as shown in step S101.

Then, once judgement is made that a disk is mounted, the flow proceeds to step S102, and control processing for forming the adjustment area used for this calibration is executed regarding a predetermined area on the disk (e.g., a test area provides at the inner circumference).

Now, forming the adjustment area is performed as follows.

The adjustment area uses three neighboring tracks; tr1, tr2, and tr3, as shown in FIG. 5A, for example. Then of these tracks, the track tr2 positioned at the center is made to be an unrecorded track wherein data is not recorded. This track tr2 will be the object of reproduction at the time of calibration. That is to say, reproduction signals are obtained by causing the laser spot Sp to trace this track tr2 as shown in FIG. 5A. Then, the two tracks tr1 and tr3 situated on either side thereof form recorded tracks by recording data serving as a particular test pattern.

As can be understood, the reason that test patterns are intentionally recorded on the tracks on either side of the track tr2 which is the object of reproduction is to create a situation wherein the effects of cross talk from the pits recorded on the tracks tr1 and tr3 are exhibited on the reproduction RF signals, so that the threshold finally set according to the detection results at the time of calibration matches conditions which are as severe as possible. using the threshold thus set allows judgment results with high reliability to be expected at the time of the actual blank check.

Also, it is known that there are pit patterns which easily exhibit cross-talk effects, and those which do not. According to the above-described reason, a data pattern which easily exhibits cross-talk effects is preferable for the pit pattern to be recording on the tracks tr1 and tr3. An example of such a data pattern from the above-described test patterns is a 6T pattern, so with the present embodiment, this 6T pattern for example may be recorded on the tracks tr1 and tr3.

Once the formation of the adjusting area is thus completed, the MPU 80 proceeds to step S103 in FIG. 3. Here, THc=0 (00h) which is the initial value of the adjustment threshold is set to the threshold register 86. Now, the variable range of the threshold is not particularly restricted, but here, a value from 00h to 7Fh (h indicates hexadecimal description) expressed by 7 bits is used for the adjustment threshold THc.

Then, in the following step S104, n=1 is set for a variable n which indicates the number of times of checking per adjustment threshold THc. In this processing, the number of times of checking per adjustment threshold THc is set at 10 times. Also, the variable Count which is the count value serving as the detection results is set to Count=0 at the subsequent step S105.

In the following step S106, control is performed so that the data reading from the track tr2 which is the unrecorded track in the adjustment area described above with reference to FIG. 5A, is executed. Thus, the reproduction RF signals corresponding to the track tr2 are supplied to the comparator 101, via the peak/bottom detector 78 shown in FIG. 1. Then, the adjustment threshold THc currently set to the threshold register 86 and the level of the envelope waveform of the reproduction RF signal are compared at the comparator 101.

Then, in the following step S107, judgement is made regarding whether or not an H level output has been obtained regarding the detected signal DT, as the comparison results at the comparator 101. Here, in the event that an H level is output, this indicates that detection results are obtained that the area is not an unrecorded area, or that detection results have been obtained that the area is a recorded area.

In this step S107, in the event that the output of the comparator 101 indicate an L level for example and detection results obtained are negative judgement results that the area is an unrecorded area, the flow proceeds to step S109, but in the event that positive results are obtained, the flow proceeds to step S108.

In step S108, the variable Count which is currently set is incremented so that Count=Count+1, and the flow proceeds to step S109.

In step S109, judgment is made regarding whether or not n>10 holds for the current variable n. That is to say, judgment is made regarding whether or not the check has been made 10 times for the one adjusting threshold.

In the event that negative results are obtained here, the variable n is incremented in step S112 so that n=n+1, following which the flow returns to the processing in step S106. Thus, detection results for unrecorded/recorded areas are obtained 10 times from the comparator 101 per adjusting threshold.

Then, once the 10 times have been completed or the detection action for one adjusting threshold as described above, positive results are obtained in step S109 and the flow proceeds to step S110.

At this point, some sort of value has been obtained for the variable Count as detection results using the adjusting threshold THc currently set.

Now, in the event that the variable Count=10, this means that all 10 detection results are erroneous detection, which indicates that the threshold THc set at this time was too close to the reproduction RF signal level corresponding to the unrecorded area. Conversely, in the event that the variable Count=0, this means that normal results have been obtained for all 10 detection results, which indicates that the threshold is appropriate as a threshold regarding the reproduction RF signal level corresponding to the unrecorded area, at least. However, there is the possibility that the threshold is close to reproduction RF signal levels corresponding to the recorded areas, which includes the possibility that the recorded area may be erroneously detected as an unrecorded area.

Accordingly, in step S110, the adjusting threshold THc currently set and the Count value obtained by performing the detection action 10 times using this adjusting threshold THc are correlated, and stored in the blank check calibration table 83.

Then, in the subsequent step S111, judgment is made regarding whether the currently set adjusting threshold THC is at the maximum value 7Fh. That is, judgment is made regarding whether or not usage of all adjusting thresholds THc have been completed with the adjusting threshold THC currently set.

In the event that negative results are obtained in step S111, incrementing of the threshold to be set to the threshold register 86 is performed in step S113 as represented by $$THc=THc+1$$

and the flow returns to step S104. Thus, the action of obtaining the detection results of the 10 times (i.e., the value of Count) each time the threshold is changed as described above and storing these results in the blank check calibration table 83, is repeatedly performed.

Figure 6:
FIG. 6 is an explanatory diagram describing the contents of the blank check calibration table according to the present embodiment.

Repeating the processing is this manner allows the blank check calibration table 83 to obtain data contents such as shown in FIG. 6.

That is to say, the value of Count (one of 0 through 10) actually obtained is stored for each of the adjustment thresholds THc 00h through 7Fh.

Then, in the event that the detection results for all thresholds THc 00h through 7Fh are obtained and positive results are obtained in step S111, the flow proceeds to step S114.

In step S114, processing is executed for determining the threshold TH optimal for using for the actual blank check, based on the detection results so far, i.e., based on the contents of the blank check calibration table 83.

The way in which this threshold TH is determined will be described with reference to FIG. 7.

Figure 7:
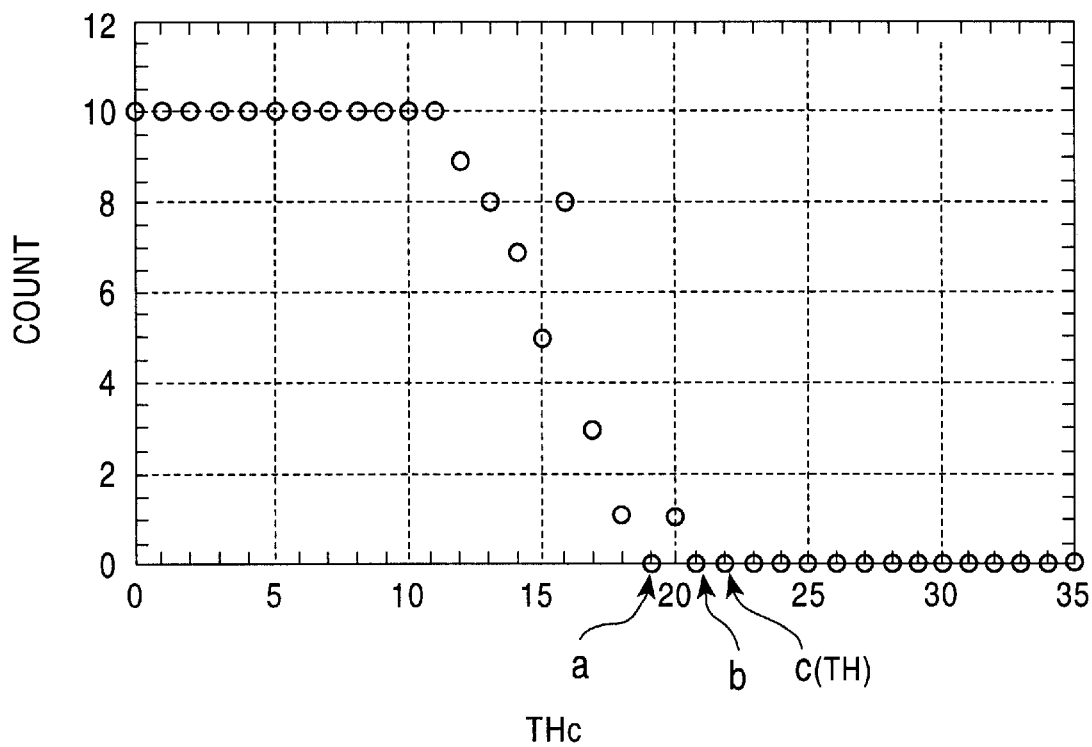
FIG. 7 is an explanatory diagram describing the process for determining the threshold from the detection results obtained by the calibration action according to the present embodiment.

For example, in FIG. 7, the relation between the adjusting threshold THc and the numerical value actually obtained as Count is shown. Here, in order to facilitate ease of description, the adjusting threshold THc is sampled from a decimal range of 0 through 35.

Here, in the range of threshold THc=0 to 11, Count 10 is the case, indicating that detection results for all 10 times were erroneous detection.

Then, in the range around threshold THc 12 to 18, the Count value gradually decreases, indicating that the detection results are becoming more accurate.

Further, at the time of threshold THc=19, results of Count=0 are obtained for the first time, and at the subsequent threshold THc=20, results of Count=1 are obtained meaning one erroneous detection. Then, from threshold THc=21 on, results of Count=0 are obtained for all.

Now, as described with the conventional art, the threshold TH for the blank check should be set as close as possible to the reproduction RF signal level corresponding to the unrecorded area, so that there is no erroneous detection of the recorded areas as unrecorded areas.

Hence, determining the threshold TH from the detection results shown in FIG. 7 for example may be performed as follows. First, since the threshold is being set as close as possible to the reproduction RF signal level corresponding to the unrecorded area, the adjustment threshold THc at the point where transition is made from a certain amount of erroneous detection being made to absolutely no erroneous detection being made is preferably used as the threshold TH.

Given such, candidates in FIG. 7 are THc=19 indicated by arrow <a> in the Figure, THc=21 indicated by arrow <b>, or THc=22 indicated by arrow <c>.

Here, in the case of THc=19 indicated by arrow <a>and THc=21 indicated by arrow <b>, there is one erroneous detection result at THc=20 between the two, meaning that reliability is lacking.

Conversely, there are no erroneous detection results with the adjustment thresholds THc on either side of THc=22 indicated by arrow <c>, so it can be said that the reliability of the detection results thereof are high.

Accordingly, in this case, the adjustment threshold THc=22 is determined for use as the threshold TH for the actual blank check. In other words, the threshold TH=22.

However, it should be noted that this description is no more than one example, and that in actual practice a higher adjustment threshold THc may be determined for use as the threshold TH, of course.

With the threshold TH determined in step S114 in FIG. 3 as described above for example, the MPU 80 for example sets this threshold TH to the threshold register 86.

Then, in the event that there is need to perform a blank check in a subsequent opportunity, the threshold TH set in the threshold register 86 is read and output.

2-2. SECOND EXAMPLE

Next, the second example of a setting action for the threshold value for the blank check according to the present embodiment will be described.

For example, with disk media, so-called plane deviation occurs at the time of rotation driving. Depending on the plane deviation, a so-called defocus state may occur regarding the focus servo control, and there are cases wherein this acts to increase cross-talk from adjacent tracks.

This will be described with reference to FIG. 8 again.

Figure 8A:
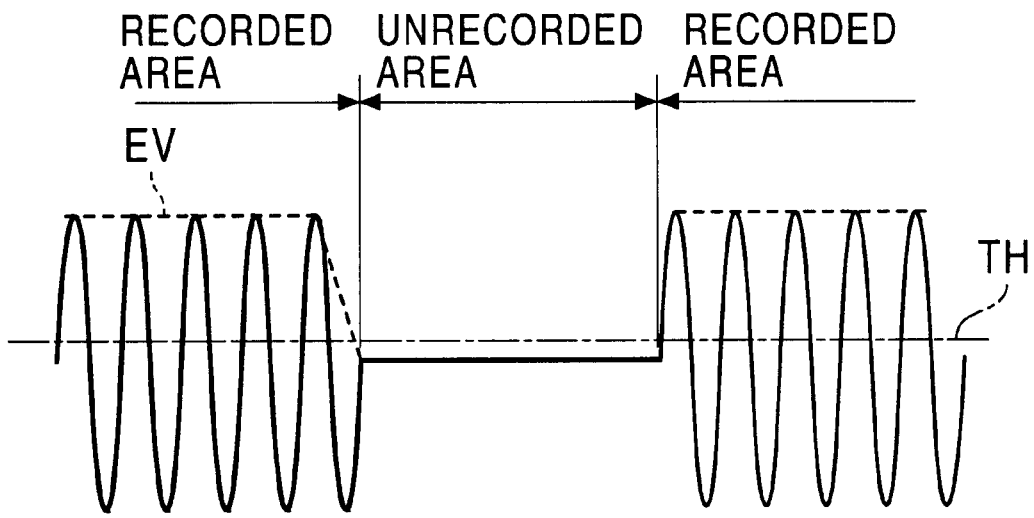
FIG. 8 is an explanatory diagram describing the blank check action.

Now, let us say that the so-called astigmatic method is used as the defocus detecting method for the focus servo. In the event that the focal position of the object lens is on the disk signal plane with regard to the distance between the object lens and disk signal plane, the laser spot Sp imaged on the signal plane as shown in FIG. 8A is approximately a true circle.

Figure 8B:
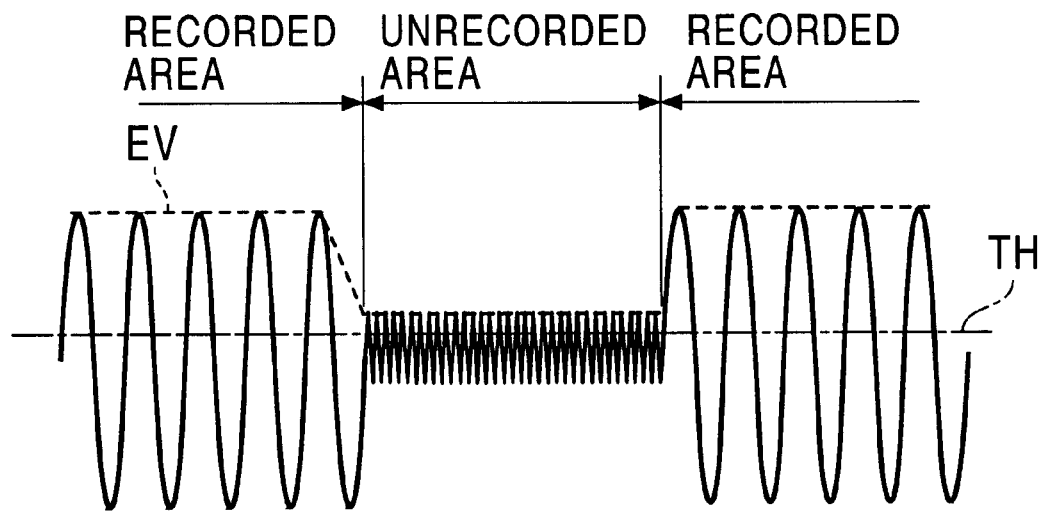

Conversely, in the event that the distance between the object lens and disk signal plane becomes far and the focal position of the object lens is in front of the disk signal plane, the laser spot Sp becomes an ellipse elongated in the track direction, as shown in FIG. 8B. On the other hand, in the event that the distance between the object lens and disk signal plane becomes near and the focal position of the object lens is deeper than the disk signal plane, the laser spot Sp becomes an ellipse elongated approximately orthogonal to the track direction, as shown in FIG. 8C (i.e., in the radial direction of the disk).

Now, in the event that the laser spot form is as shown in FIG. 8C, the reflected light information thereof is easily affected by the pits recorded on the tracks adjacent to the track currently being traced. In other words, the effects of cross-talk increase. Under such conditions, the noise component superimposed on the reproduction RF signals is great, and in the event that the threshold for the blank check is set using signals that have not been affected very much by cross-talk, there is a greater change that the blank check results in erroneous detection in such defocus states.

Also, even in the case that the laser spot form is such as shown in FIG. 8B, a defocus state is still occurring, meaning that the effects of noise are encountered easily.

Accordingly, for a second example, a defocus state owing to the effects of planar deviation is forcibly created and calibration action for setting the threshold is performed thereby, so consequently highly reliable blank checking can be performed even in environments wherein a defocus state owing to the effects of planar deviation is occurring.

FIG. 4 is a flowchart illustrating the actions for realizing this threshold setting action as the second example. Note that the processes in this Figure are also executed by the MPU 80.

With the processing shown in this Figure as well, the MPU 80 first waits for a disk to be mounted in step S201, and in the event that a disk is mounted, proceeds to step S202, and executes the control processing for forming an adjusting area, i.e., performs the same processing as steps S101 and S102 in FIG. 3.

Then, in this case, in the subsequent step S203, a focus bias FB of a value indicated by $$FB=F0+dF \qquad \text{(Expression 1)}$$

is set for the focus bias FB. Here, F0 is the current focus bias which has been used so far, and dF is the offset value corresponding to the defocus amount obtained by the plane deviation.

Regarding this value dF, the defocus amount obtained by the plane deviation can be determined to a certain degree for each device model, by making measurements and the like beforehand. Further, though there are two types of plane deviation states, i.e., the direction of the signal plane being distanced from the object lens and the direction of the signal plane coming closer to the object lens as compared to the normal position of the disk, the above focus bias FB shown in Expression 1 is for obtaining the defocus state wherein the signal plane is being distanced from the object lens.

Now, at the time of setting the focus bias FB as described above, an arrangement may be made wherein the MPU 80 employs offset value dF stored in the internal ROM or the like beforehand and performs the computation in Expression 1 regarding the current focus bias F0, which then is supplied to the subtracter 84 (see FIG. 2) as the actual focus bias. Incidentally, in the event that the focus bias F0 is fixed, the focus bias value shown in Expression 1 may be held in the focus bias table 82.

Next, in the subsequent step S204, calibration processing is executed for obtaining the threshold TH1 under the conditions of the defocus state having been obtained by the above Expression 1.

The calibration processing in this step S204 executes the processing in the step S103 through S114 described above in FIG. 3. However, in this case, the threshold TH1 is determined in step S114. Then, when the processing of step S204 ends, the flow proceeds to step S205, and this threshold TH1 is held in the internal RAM for example.

In the subsequent step S206, a focus bias FB of a value indicated by $$FB=F0-dF \qquad \text{(Expression 2)}$$

is set for the focus bias FB. The focus bias FB obtained by Expression 2 is for obtaining the defocus state in the direction wherein the signal plane is being brought closer to the object lens.

Next, in the subsequent step S207, calibration processing is executed for obtaining the threshold TH2 under the conditions of the defocus state having been obtained by the above Expression 2.

The calibration processing in this step S207 also executes the processing in the step S103 through S114 described above in FIG. 3. In this case, the threshold TH2 is determined in step S114. Then, when the processing of step S207 ends, the flow proceeds to step S208, and this threshold TH2 is held in the internal RAM for example.

Then, in the following step S209, the thresholds TH1 and TH2 which have been obtained by the processing thus far are used to determine a threshold TH to be used for the blank check.

Though which threshold TH should be determined in what manner will not be particularly restricted here, an arrangement can be conceived wherein the greater value of the thresholds TH1 and TH2, i.e., the one corresponding to the hither level with regarding to the reproduction RF signal level corresponding to the unrecorded area, is selected. Or, an average value may be calculated and used as the threshold TH.

Now, the description made so far regarding the processing actions has involved sequentially changing the adjustment threshold THc from a smaller value to a larger value, but an arrangement may be made wherein the change is made in reverse, from a larger value to a smaller value. Also, in this case, the adjustment threshold THc has the 128 steps of 00h through 7Fh, but an arrangement may be conceived wherein the variation of the adjustment threshold THc is terminated at a point that the optical adjustment threshold THc has been obtained to a certain degree. That is to say, there is no need to perform this for all values 00h through 7Fh. Also, the number of steps and the quantization of the steps for the adjustment threshold THc may be changed to meet actual usage.

Also, with the description so far, an adjustment area is formed at the time of setting the threshold, but an arrangement may be made wherein an adjustment area is formed on the disk beforehand as shown in FIG. 8A, so that this adjustment area is accessed at the time of setting the threshold.

Also, according to the description so far, the setting of the threshold according to the present embodiment is made at the time of mounting the disk, but the present invention is not restricted to this.

For example, the noise level superimposed on the reproduction RF signals may change in the event that the environmental temperature of the reproduction RF signal processing system changes for example, so a configuration may be conceived wherein a mechanism for detecting temperature is provided within the disk drive device, and in the event that judgement is made that the temperature has risen to or above a predetermined temperature, the threshold is set at a predetermined opportunity.

Also, an arrangement may be made wherein such threshold settings are made at the time of shipping from the plant line and stored in non-volatile memory, wherein subsequent blank checking is performed based on the threshold value held in the non-volatile memory. In this case, changes in the disk drive device over time for example cannot be dealt with, but there is the advantage that the wait time for starting recording or reproducing can be reduced, since calibration is not executed at the time of mounting the disk.

Also, regarding the disk drive device of the present embodiment, description of unrecorded area detection has been made mainly regarding a CD-R, but the present invention is applicable to, e.g., magneto-optical disks called MOs or MDs, disk media for recording using the phase change method, such as DVD-RAM and DVD-RW, and so forth.

As described above, the present invention is arranged such that at the time of setting a threshold for a blank check, the adjustment threshold is changed while reproducing an adjustment area serving as an unrecorded area on the disk-shaped recording medium. Then, based on the comparison results between this adjustment threshold and the reproduction RF signals, the threshold to be used for the actual blank check is set.

According to a configuration which makes settings thus, a threshold appropriate for each device is automatically set, regardless of conditions such as differences in noise levels superimposed on reproduction RF signals, from one device to another. In other words, a blank check with high reliability can be expected regardless of irregularities in properties from one device to another. Also, the present invention is capable of dealing with change in noise levels over passage of time.

Also, at the time of setting the threshold for the blank check as described above, a defocus state corresponding to the amount of plane deviation of the disk is created, meaning that the detection results are obtained under severe conditions assuming defocusing corresponding to the amount of plane deviation of the disk. Further, setting the threshold according to the detection results allows a blank check action with even higher reliability to be obtained, which matches the actual disk driving state.

Also, an accurate threshold can be obtained by obtaining comparison detection results with reproduction signal levels for each changed adjusting threshold multiple times, and thus a blank check action with high reliability can be obtained from this point, as well.

Further, an unrecorded track is used for the adjustment area from which signals are read for setting the threshold, so threshold setting talking the effects of cross-talk from adjacent tracks into consideration can be enabled, by recording data of a predetermined data pattern on the tracks adjacent to the unrecorded track. An accurate threshold can be obtained from this point as well, in that conditions of cross-talk have been dealt with.

Also, a data pattern which readily causes cross-talk effects is recorded on the tracks adjacent to the unrecorded track, thereby further bolstering the above advantages.

Also, arranging for recording to this data pattern to be performed by the disk drive device enables the adjusting area necessary for the threshold setting according to the present invention to be formed by the disk drive device as long as the disk medium is recordable, even if there is no such adjusting area provided thereupon beforehand. This also leads to more widespread general-purpose use.

What is claimed is:

1. A disk drive apparatus, comprising:
information writing/reading means for recording or reproducing information by irradiating laser beams onto a signal plane of a disk-shaped recording medium;
unrecorded area detecting means for detecting unrecorded areas on said signal plane, based on the results of comparing reproduction signal levels from said information writing/reading means with a predetermined threshold; and
threshold adjusting means for executing adjustment actions for setting said threshold;
said threshold adjusting means comprising:
action control means for controlling said information writing/reading means so that a reproducing action is performed regarding a certain adjusting area which is an unrecorded area;

threshold varying means for changing the adjustment threshold at the time of performing reproducing actions regarding said adjusting area; and threshold determining means for making comparison for each changed adjustment threshold with reproduction signal levels, and determining said threshold based on the comparison results.

2. A disk drive apparatus according to claim 1; wherein said information writing/reading means further comprises a focus control means for variably controlling the focal point of an object lens located in the optical path of said laser beam;

said focus control means controlling the focal point of said object lens such that a defocused state corresponding to the amount of planar deflection of said disk-shaped recording medium as to said signal plane is obtained, in the event that adjusting action for setting said threshold is being executed.

3. A disk drive apparatus according to claim 1, wherein said threshold determining means executes comparison with reproduction signal levels regarding one adjustment threshold multiple times.

4. A disk drive apparatus according to claim 1, wherein an unrecorded track with no information recorded thereon is used for said adjustment area, and wherein the track adjacent to this unrecorded track is a recorded track with a predetermined bit pattern recorded thereon.

5. A disk drive apparatus according to claim 1, wherein a bit pattern is recorded on said recorded track whereby the leakage amount of data equal to or exceeding that required is obtained.

6. A disk drive apparatus according to claim 4, wherein said action control means is enabled to execute control such that the writing of a bit pattern by said information writing/reading means for forming said adjustment area is performed.

7. An unrecorded area detecting method, which is applied to a disk drive apparatus for recording or reproducing information by irradiating laser beams onto a signal plane of a disk-shaped recording medium;

and wherein execution of:

an unrecorded area detecting process for detecting unrecorded areas on said signal plane based on the results of comparing reproduction signal levels with a predetermined threshold; and a threshold adjusting process for setting said threshold are enabled;

said threshold adjusting process comprising:

an action control process for executing control so that a reproducing action is performed regarding a certain adjusting area which is an unrecorded area;

a threshold varying process for changing the adjustment threshold at the time of performing reproducing actions regarding said adjusting area; and a threshold determining process for making comparison for each changed adjustment threshold with reproduction signal levels, and determining said threshold based on the comparison results.

8. An unrecorded area detecting method according to claim 7;

wherein execution of a focus control process for controlling the focal point of an object lens located in the optical path of said laser beam so as to focus on said signal plane, is further enabled;

said focus control process controlling the focal point of said object lens such that a defocused state corresponding to the amount of planar deflection of said disk-shaped recording medium as to said signal plane is obtained, in the event that adjusting action for setting said threshold is being executed.

* * * * *